Figure 1:
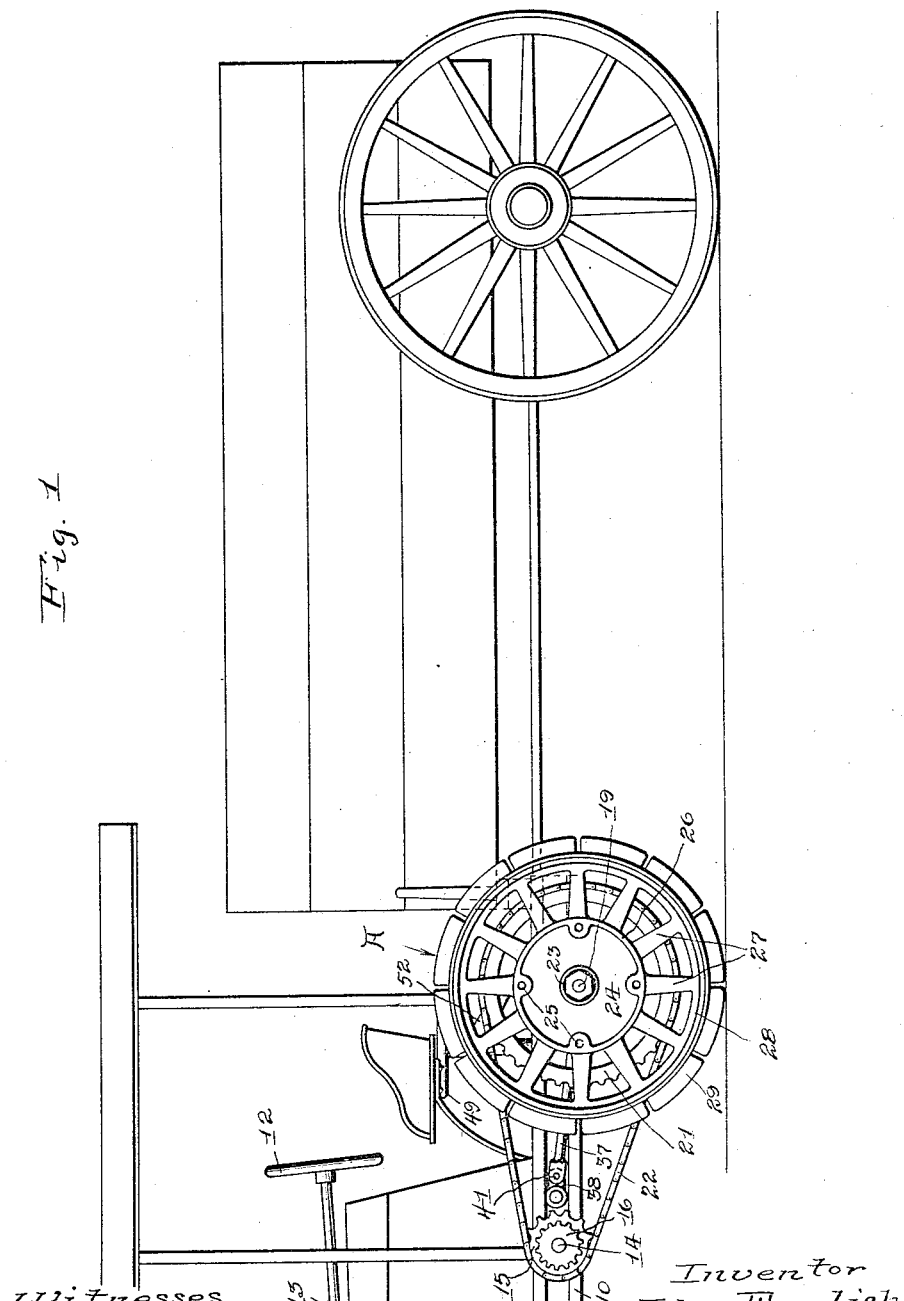

J. FROELICH.
COMBINATION TRUCK AND TRACTOR.
APPLICATION FILED MAY 10, 1915.

1,282,064.

Patented Oct. 22, 1918.
3 SHEETS—SHEET 1.

Witnesses
A.C.Caswell
W.H.Williams

Inventor
John Froelich
John E. Stryker

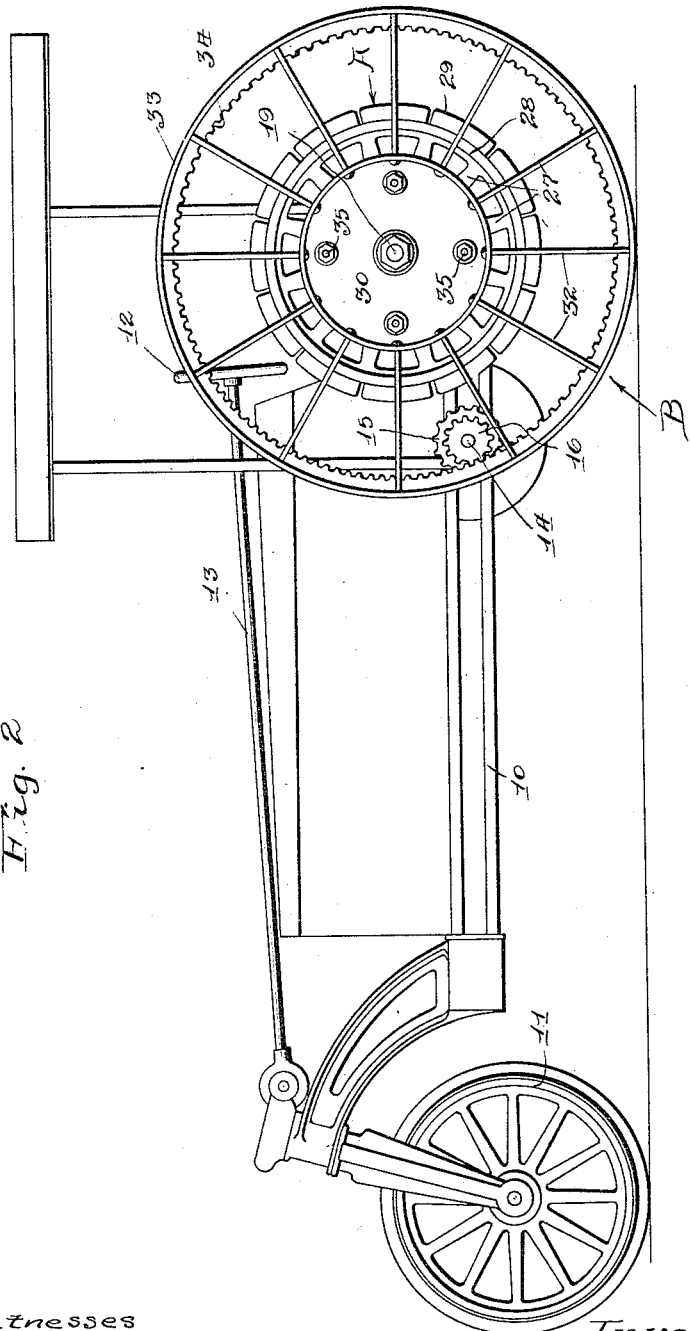

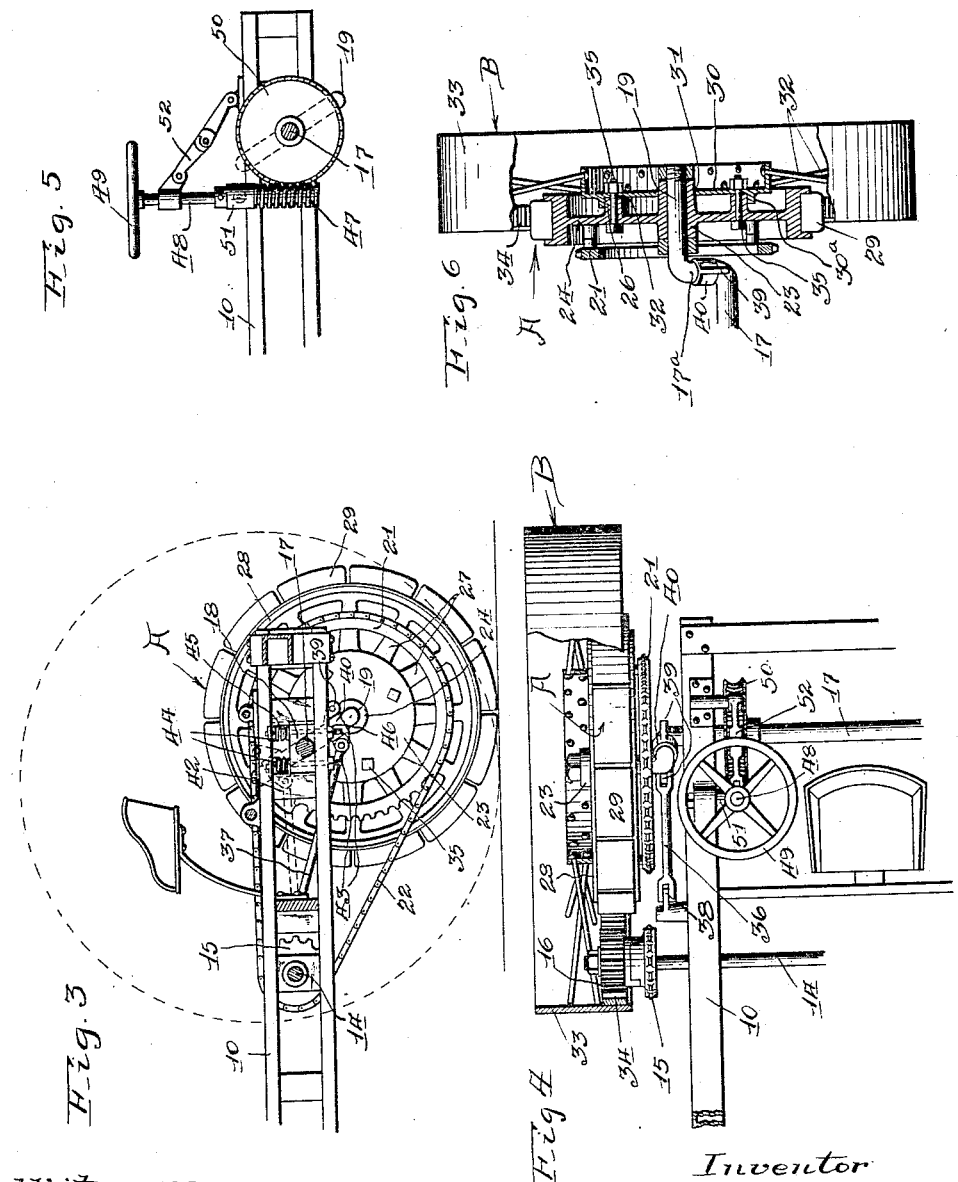

UNITED STATES PATENT OFFICE.

JOHN FROELICH, OF ST. PAUL, MINNESOTA, ASSIGNOR TO LESLIE S. HACKNEY, OF ST. PAUL, MINNESOTA.

COMBINATION TRUCK AND TRACTOR.

1,282,064.　　　　Specification of Letters Patent.　　Patented Oct. 22, 1918.

Application filed May 10, 1915. Serial No. 27,070.

*To all whom it may concern:*

Be it known that I, JOHN FROELICH, a citizen of the United States, residing at St. Paul, in the county of Ramsey and State of Minnesota, have invented new and useful Improvements in Combination Trucks and Tractors, of which the following is a specification.

Its object is to provide a device of this kind adapted for use as a truck and tractor and designed to be quickly and easily converted to either use.

More specifically, it is my object to provide a power-driven vehicle with two sets of driving wheels of different sizes, said vehicle being supplied with an axle, which may be adjusted to support the vehicle upon either pair of wheels.

My invention also includes various novel features of construction, which are hereinafter particularly described and pointed out in the claims.

In the drawings, Figure 1 is a side elevation of my improved vehicle, employed as a truck and illustrates a wagon, one end thereof being supported upon and pivotally attached to said vehicle; Fig. 2 is also a side elevation and illustrates the vehicle employed as a tractor; Fig. 3 is a detail longitudinal sectional view, illustrating among other things the adjustable axle and driving mechanism for one of the truck wheels; Fig. 4 is a detail plan view illustrating particularly the adjustable axle, the mechanism for shifting said axle, a tractor wheel and driving mechanism for said wheel; Fig. 5 is a detail side elevation of the axle adjusting mechanism and Fig. 6 is a detail sectional view of a truck wheel and plan view of a tractor wheel partly broken away, and shows the method of securing a tractor wheel upon a truck wheel.

Referring to the drawings, I have used the reference numeral 10 to indicate the frame of my improved vehicle, which is preferably formed of spaced channel bars. A steering and supporting wheel 11 of ordinary design carries the forward end of the frame and is controlled as usual by a hand-wheel 12 on a steering shaft 13. An engine, or other suitable source of power (not shown) is supported upon the frame and is operatively connected with a transverse power-shaft 14 revoluble in and extending through the frame 10. This shaft is supplied at each end with a driving sprocket wheel 15 and a spur gear 16 on the outer side of said sprocket wheel. A rear axle 17 passing transversely through the frame 10 is mounted in bearing blocks 18 in said frame and each end of the shaft is bent to form a crank. The offset portions of said shaft form journals 19 in alinement with each other, upon each of which is mounted a truck wheel A. Each truck wheel is supplied with a sprocket wheel 21 secured upon the inner side thereof and a sprocket chain 22 passes over each sprocket wheel 21 and the driving sprocket 15 adjacent thereto.

Each of said truck wheels A comprises a hub 23, adapted to receive a journal 19 of the axle 17, a web 24 formed with perforations 25 therein and with an annular ridge 26 on its outer face, spokes 27, rim 28 and tire 29. Each tractor wheel B consists of a web 30 formed with a central opening 31 and with perforations 32 therein, an annular flange 30ª upon the face of said web, spokes 32 radiating from the web and a rim 33 with an internal gear 34 secured upon its inner periphery.

When it is desired to employ the vehicle as a tractor, the tractor wheels A are secured upon the truck wheels B and when said vehicle is to be used as a truck, the tractor wheels B are omitted. In assembling a truck and tractor wheel the opening 31 in the web 30 of the latter receives the hub 23 of the former and the annular flange 30ª on said web 30 fits snugly around the annular ridge 26 on the web 24 of the truck wheel. Bolts 35 are placed through the perforations 25 and 32 in the webs 24 and 30 and secure said wheels together. The internal gear 34 of each tractor wheel is arranged to mesh with one of the spur gears 16 on the power-shaft 14 and furnishes an efficient driving connection between a tractor wheel and said power-shaft 14.

I secure the shaft 17 with the journals 19 up or down by means of torsion rods 36 and 37, the former being employed when the tractor wheels are used and the latter when said wheels are omitted. These rods are identical, except that the rods 37 are longer than the rods 36. Said rods are bifurcated at their ends and each rod receives at one end a lug 38 on the frame and at its other end a lug 39 on a clip 40 secured upon the bend 17ª of the axle 17. Said rods are pivotally connected to said lugs 38 and 39 by pins 41 or the like.

The rear of the frame 10 is yieldingly supported upon the axle 17 in the following manner: The bearing blocks 18, in which the axle 17 is mounted, are movable vertically between guides 42 on the frame. Hanger bolts 43 are slidable in said blocks and each of these bolts is provided with a collar 44 at its upper end and with a coiled spring 45, interposed between the collar 44 and block 18, through which said bolt passes. A nut 46 threaded on the lower end of each bolt 43, beneath the frame, provides means whereby the tension of the springs 45 may be regulated.

I furnish an adjusting device to turn the axle 17 and secure the same until the torsion rods are attached. A worm 47, upon a shaft 48, attached to a hand-wheel 49, is arranged to mesh with the worm wheel 50 upon the axle 17. The shaft 48 is revoluble in a bearing 51, which is pivotally mounted upon the frame 10, and may be tilted to remove the worm 47 from engagement with the worm wheel 50 so as to permit the free movement of the frame with respect to the axle 17. A brace 52 between said shaft and frame, operates to rigidly secure the shaft in upright position with the worm 47 in engagement with the worm wheel 50. Said brace is designed to break and fold rearwardly to permit the tilting of the shaft 48, when it is desired to disconnect said worm 47 from the worm gear 50.

In adapting this device to use as a tractor, the rear of the frame is jacked up, the worm 47 is shifted to mesh with the worm wheel 50 and the torsion rods 37 are removed. The hand-wheel 49 is then rotated to turn the axle 17 to position indicated in Figs. 4 and 6. The chains 22 being slackened are easily removed from the sprocket wheels 15 and 21 and the tractor wheels B are secured upon the truck wheels A, as above described, the internal gears 34 meshing with the spur gears 16 on the power-shaft 14. The torsion rods 36 are then attached and the worm 47 is tilted out of engagement with the worm wheel 50. To convert the machine to use as a truck, the tractor wheels B are detached from the truck wheels A and the chains 22 replaced upon their sprocket-wheels. The torsion rods 36 are removed and the axle 17 turned by the hand-wheel 49 to original position, whereupon the torsion rods 37 are attached and the worm 47 finally disengaged from the worm wheel 50.

What I claim as my invention and desire to protect by Letters Patent, is:

1. In a vehicle of the class described, a frame, an axle having journals adapted to be shifted vertically, sets of wheels of different diameters adapted to be revolubly mounted upon said axle and independent connections for severally driving each set of wheels from a common source of power.

2. In a device of the class described, a frame, a floating and revoluble axle mounted on the frame and having offset journals thereon, sets of wheels of different diameters adapted to be mounted on said journals, mechanism designed to be connected with (and disconnected from) said axle to turn the same and thereby adjust its journals for either set of wheels, compensating means to secure the axle against rotation, and independent connections for driving each set of wheels from a common source of power.

3. In a vehicle of the class described, a frame, a yielding and revoluble axle on the frame having offset journals thereon, shock absorbing devices between said axle and frame, sets of wheels of different diameters adapted to be mounted on said journals, mechanism to turn said axle to thereby raise and lower the journals to suit said wheels, said mechanism being adapted to be disconnected from said axle, and sets of torsion rods adapted to be placed between the frame and axle to severally secure said axle.

4. In a vehicle of the class described, a frame, an axle revoluble in the frame and having offset journals thereon, wheels of different sizes adapted to be revolubly mounted upon said journals, means for turning said axle to adjust the same, means to secure said axle in different positions of its adjustment, and independent connections for driving each wheel from a common source of power.

5. In a vehicle of the class described, the combination of a frame, an axle yieldingly and revolubly mounted in the frame and formed with offset journals thereon, driving wheels of different sizes adapted to be revolubly mounted upon said journals, a worm wheel on the axle, a shaft pivotally and revolubly mounted on the frame, a worm on said shaft adapted to mesh with said worm wheel, a hand-wheel on the shaft for turning the same and a brace to hold said shaft in position, securing said worm in engagement with the worm wheel, said brace being adapted to fold and permit the tilting of said shaft.

In testimony whereof, I have signed my name to this specification in the presence of two subscribing witnesses.

JOHN FROELICH.

Witnesses:
F. C. CASWELL,
J. E. STRYKER.

Copies of this patent may be obtained for five cents each, by addressing the "Commissioner of Patents, Washington, D. C."